Figure 5:
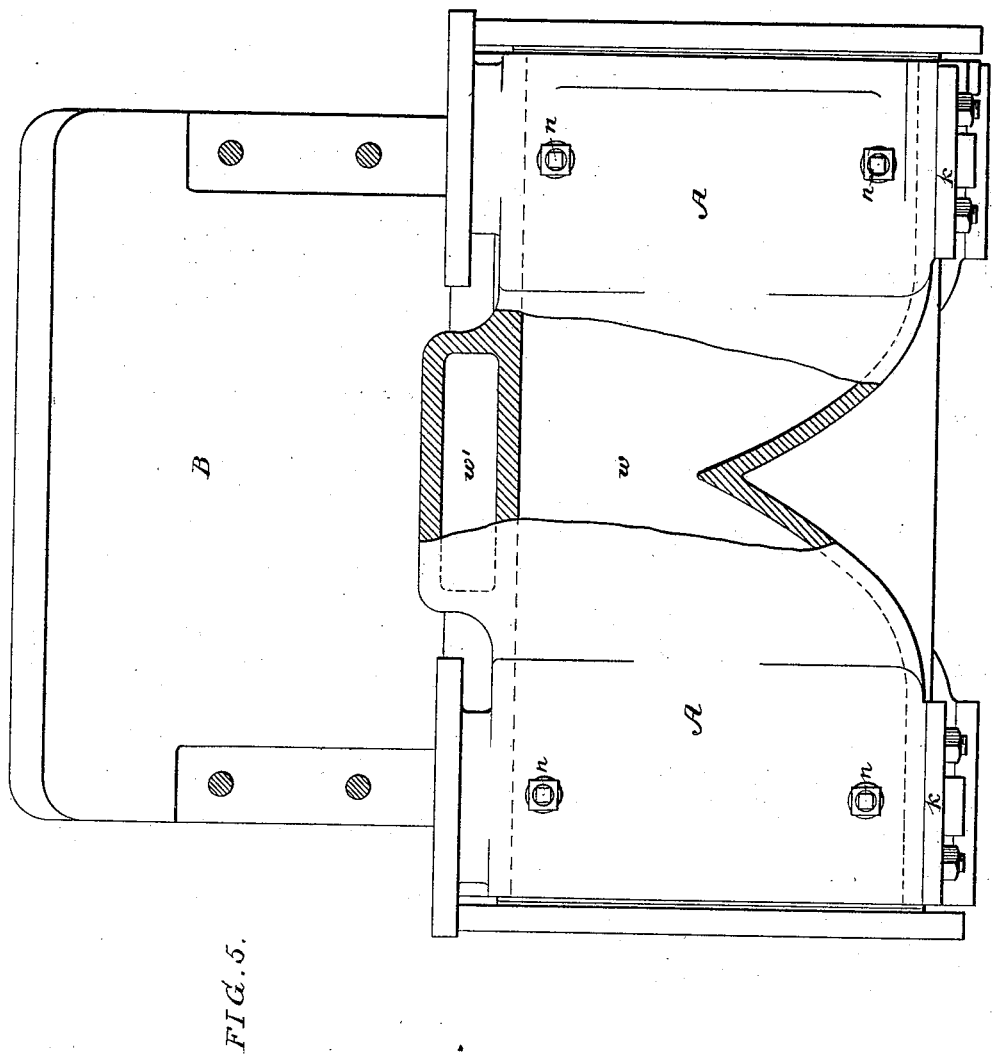

(No Model.)
G. S. STRONG.
CYLINDER AND VALVE FOR ENGINES.
No. 320,893. Patented June 23, 1885.
4 Sheets—Sheet 1.
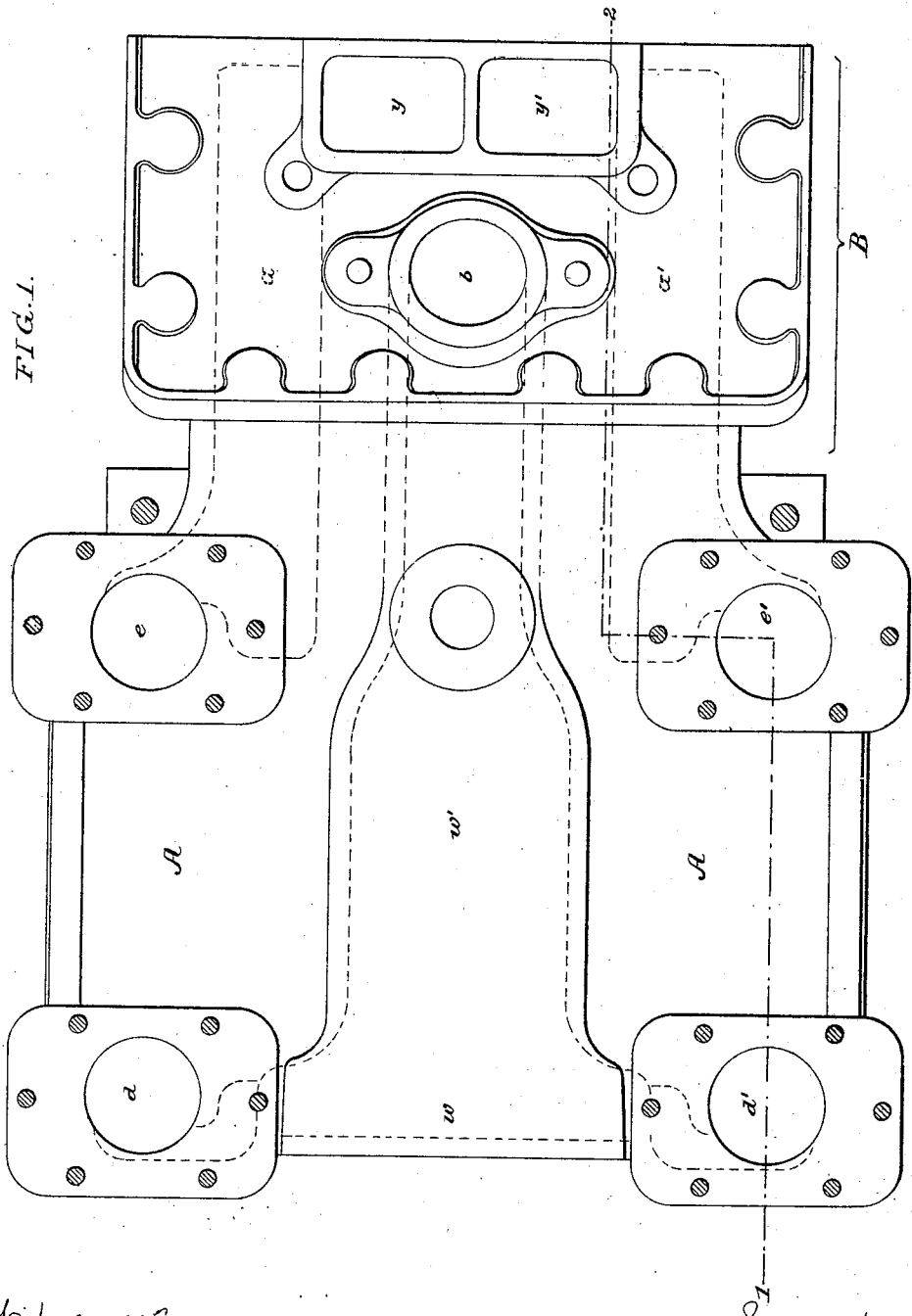
Witnesses:
John M. Clayton
Harry Drury
Inventor:
George S. Strong
by his Attorneys
Howson & Sons (No Model.)  4 Sheets—Sheet 2.
G. S. STRONG.
CYLINDER AND VALVE FOR ENGINES.
No. 320,893.  Patented June 23, 1885.
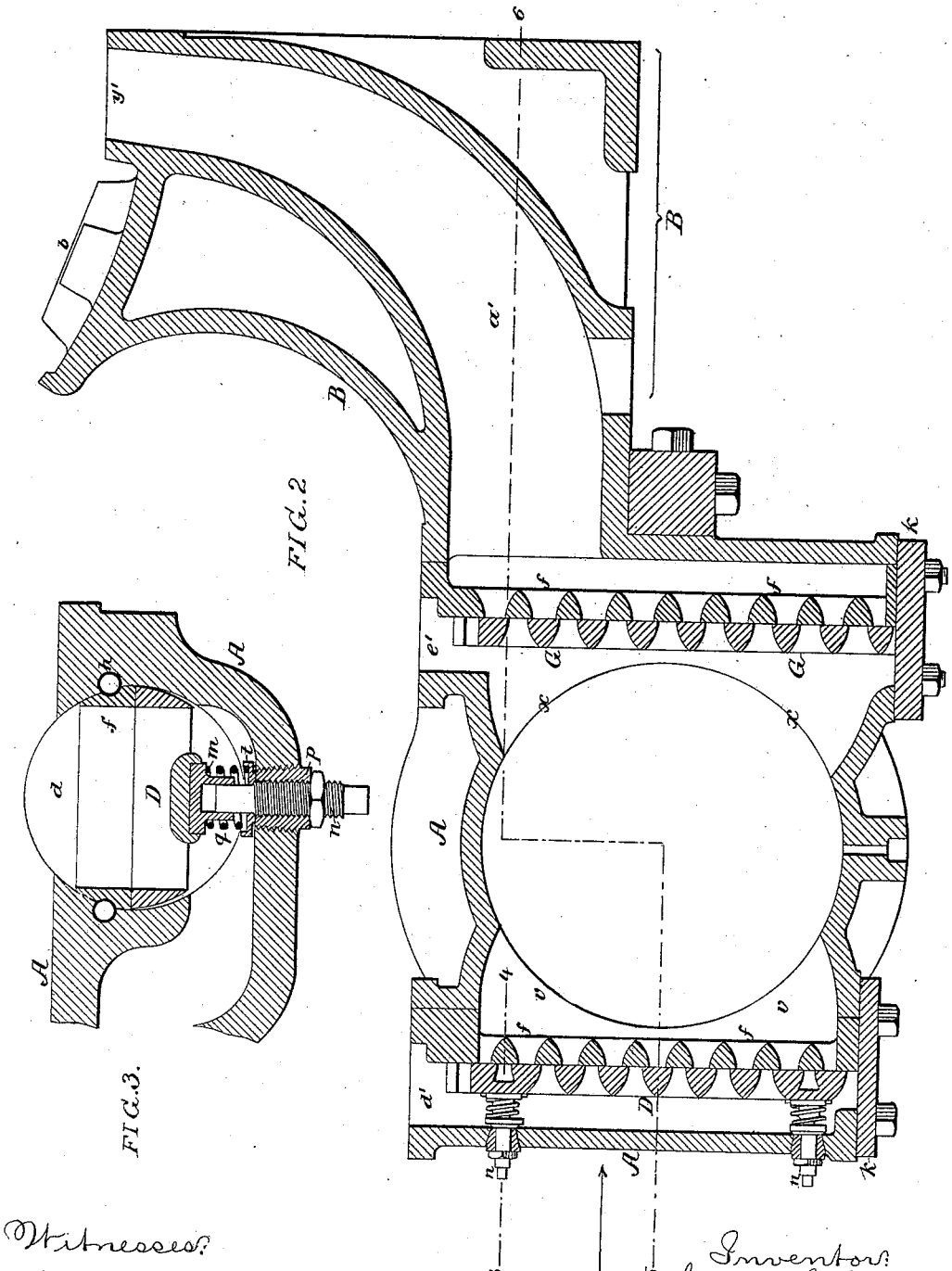
Witnesses:
John M. Clayton
Harry Drury
Inventor:
George S. Strong
by his Attorneys
Howson & Sons

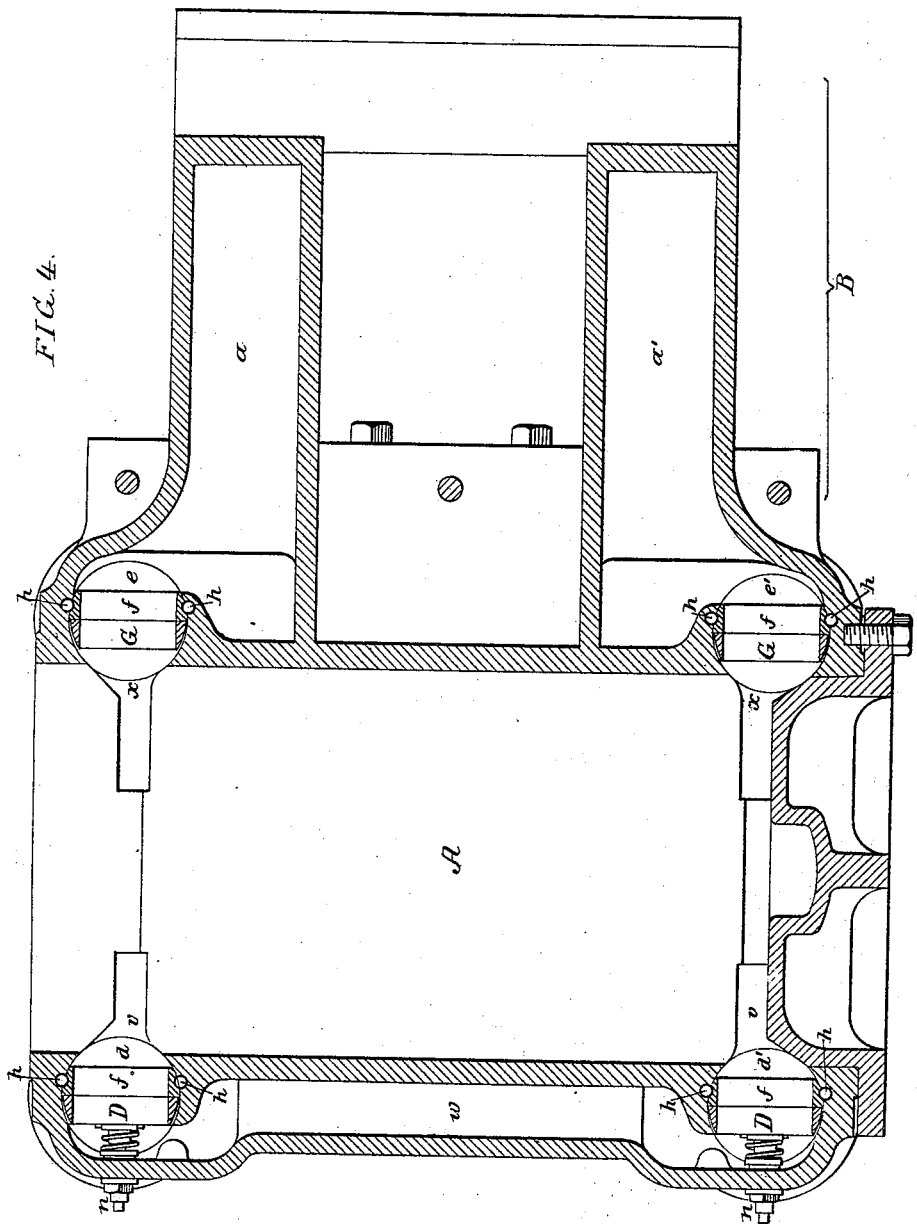

(No Model.)

4 Sheets—Sheet 4.

G. S. STRONG.
CYLINDER AND VALVE FOR ENGINES.

No. 320,893. Patented June 23, 1885.

Witnesses:
John M. Clayton
Harry Drury

Inventor:
George S. Strong
by his Attorneys
Howson & Sons

UNITED STATES PATENT OFFICE.

GEORGE S. STRONG, OF PHILADELPHIA, PENNSYLVANIA.

CYLINDER AND VALVE FOR ENGINES.

SPECIFICATION forming part of Letters Patent No. 320,893, dated June 23, 1885.

Application filed November 3, 1884. (No model.)

*To all whom it may concern:*

Be it known that I, GEORGE S. STRONG, a citizen of the United States, and a resident of Philadelphia, Pennsylvania, have invented certain Improvements in Valves for Steam-Engines, of which the following is a specification.

My invention relates to certain improvements in valves for steam-engines, fully described and claimed hereinafter.

In the accompanying drawings, Figure 1, Sheet 1, is a plan view of the steam-cylinder of a locomotive, showing the circularly-chambered chests for the valves and valve-seats, and showing by dotted lines the steam and exhaust passages; Fig. 2, Sheet 2, a vertical section on the line 1 2, Fig. 1; Fig. 3, a sectional plan (drawn to an enlarged scale) on the line 3 4, Fig. 2; Fig. 4, Sheet 3, a sectional plan view on the line 5 6, Fig. 2; and Fig. 5, Sheet 4, an elevation, (partly in section,) looking in the direction of the arrow, Fig. 2.

A is the cylinder, and B its extension, *y y'* being the outlets for the exhaust-passages, and *b* the inlet for the steam. Referring to Figs. 1 and 4, it will be seen that the cylinder has at one end two cylindrically-chambered chests, *d* and *e*, and at the opposite end two similar chests, *d'* and *e'*, these chests extending entirely through the casting, of which the cylinder forms one part and its extension B the other part, the chests *d d'* containing each a steam-valve, D, and its seat *f*, while the chests *e e'* are devoted each to an exhaust-valve, G, and its seat *f*. Each chest is truly bored, and each seat *f* (see Fig. 3) has edges made on the arc of a circle to coincide with the bore of the chest, in which it is secured by tubes or rods *h*, driven into holes bored partly in the edges of the seat and partly in the wall of the chest, and extending from end to end of the chest, the tube or rod thus forming a key for securing the seat rigidly in position within the chest. Tubes are preferred, because after their introduction they can be expanded by hydraulic pressure. The keys thus formed also serve as packing to prevent any leakage of steam through the joints between the edges of the seat and walls of the chamber.

Each valve is of the gridiron style, and each seat has openings to correspond with those of its valve.

The edges of each valve are made on a less curve than the bore of the chest, as shown in Fig. 3, so that the valves are at liberty to leave their seats in order to permit the escape of water of condensation which may have collected in the cylinder, and which is subjected to pressure as the piston reaches the end of its stroke.

The plan described of applying the seats *f* to the chest has the advantage of economy, for the chests can be bored by an ordinary boring machine, and the seats made to fit accurately to the chest by turning the edges in an ordinary lathe. Not only is the expensive work demanded in the construction of ordinary valves and seats avoided, but the usual covers for the valve-chests, such as those shown in the aforesaid patent, are rendered unnecessary.

The chests are closed at the bottom by plates *k*, Fig. 2, and at the top by plates not shown in the drawings, the spindles of the valves passing through stuffing-boxes on the latter plates, as usual. In order to prevent any backlash of the steam-valves, except when they are subjected to undue pressure by the accumulated water of condensation, as above described, I use the device shown in Figs. 2 and 3.

A socket, *m*, fits against the back of the valve between ribs on the same, and into this socket projects the plain end portion of a set-screw, *n*, the threaded portion of which screws into a tapering plug, *p*, which is screwed into the wall of the valve-chest.

A spiral spring, *q*, intervenes between the socket and a disk, against which bears a shoulder on the set-screw, so that by turning the latter the rigidity of the spring may be increased or diminished. There are two of these devices for each steam-valve, which can slide freely against the sockets, but which are maintained in contact with their seats by the springs.

Referring to Figs. 3 and 4 it will be seen that the chest of each exhaust-valve has a direct communication at *x* with the cylinder, and that one chest, *e*, communicates with the passage *a*, the other chest with the passage *a'*. Throughout the entire structure and from the exhaust-valve chests *e e'* to the outlets *y y'* these passages are separate from each other.

The dotted lines in Fig. 1 indicate the courses of the separate exhaust-passages from the exhaust-chests to the outlets.

Each of the steam-valve chests $d\ d'$ has a direct communication with the steam-cylinder at $v$ and with a steam-chamber, $w$, the latter communicating with a passage, $w'$, extending partly over the cylinder, and this passage, the course of which is indicated by dotted lines in Fig. 1, terminating at the inlet $b$.

The peculiar shape of the steam-chamber $w$ is most clearly shown in Fig. 5.

I claim as my invention—

1. The combination of the circular valve-chest of a steam-engine, with a valve-seat having edges made in arcs of circles to coincide with the bore of the chest, and keyways partly in the edges of the seat and partly in the walls of the chest, with keys for securing the chest in place and forming a packing between the two, as set forth.

2. The combination of the circularly-chambered valve-chest of a steam-engine, and a valve-seat fitted thereto, with tubular keys $h$, introduced into holes drilled partly in the seat and partly in the wall of the chest, substantially as specified.

In testimony whereof I have signed my name to this specification in the presence of two subscribing witnesses.

GEO. S. STRONG.

Witnesses:
 JOHN M. CLAYTON,
 HARRY SMITH.